UNITED STATES PATENT OFFICE.

WALTER B. BROWN, OF CHICAGO, AND ROBERT A. HOLBROOK, OF CHICAGO HEIGHTS, ILLINOIS, ASSIGNORS TO VICTOR CHEMICAL WORKS, OF CHICAGO, ILLINOIS, A CORPORATION OF ILLINOIS.

BAKING PREPARATION.

990,699. Specification of Letters Patent. Patented Apr. 25, 1911.

No Drawing. Application filed February 15, 1910. Serial No. 543,976.

*To all whom it may concern:*

Be it known that we, WALTER B. BROWN, residing at Chicago, in the county of Cook and State of Illinois, and ROBERT A. HOLBROOK, residing at Chicago Heights, in the county of Cook and State of Illinois, both citizens of the United States, have invented certain new and useful Improvements in Baking Preparations, of which the following is a specification.

This invention relates to an improved baking preparation; and has for its essential object to produce, at a low cost, a baking preparation of quality superior to similar products now made.

Ordinary acid-ortho-phosphate of calcium, while a commercial success as the acid ingredient of baking preparations for household consumption, is not entirely suitable for all baking purposes, and especially it is not satisfactory for use in bakeries, where large quantities of wet mixed dough are often allowed to stand for considerable time before being baked. This is because the chemical activity of such acid-ortho-phosphate of calcium seems to be too rapid, the leavening properties of the baking preparation to a certain extent being dissipated before heat is applied to the dough. The acid salt, however, which we employ in our invention is slower in its chemical action on the carbonate or bicarbonate of an alkali with which it is mixed, and closely approximates the action of cream of tartar in this respect.

We do not limit our invention to any particular form of product, since it may be used as a baking powder, or in the form of a so-called "self-rising" flour, or in the form of a dough ready for baking and containing the elements of our new leavening agent, or in any other well known manner.

In the practice of our invention, it has been found that acid-pyro-phosphate of calcium, or the product obtained by roasting acid-ortho-phosphate of calcium in a prescribed manner, is of particular value as the acid element of a leavening agent for baking purposes. By subjecting the acid-ortho-phosphate of calcium $$(CaH_4(PO_4)_2)H_2O,$$

to a proper degree of heat to remove part of the chemical water, as shown by this formula, we produce an acid salt of great value in baking preparations. The most suitable form of this acid salt corresponds to the formula $CaH_2P_2O_7$, being produced by the reaction, $$CaH_4(PO_4)_2H_2O - 2H_2O = CaH_2P_2O_7.$$

This salt, when treated in the usual manner with bicarbonate of soda, conducts itself substantially as shown by the equation:

$$3CaH_2P_2O_7 + 4NaHCO_3 = 3CaHPO_4 + Na_2HPO_4 + 4CO_2 + 3H_2O + 2NaPO_3.$$

Careful baking tests have shown that baking preparations in which this acid-pyrophosphate of calcium was the principal ingredient will yield baking results at least equal to those obtained by using the ordinary and well known baking preparations.

Pyro-phosphate of calcium is non-hygroscopic, and baking preparations of which it is the principal ingredient are found to keep well under all ordinary conditions.

The above preparation, namely, $CaH_2P_2O_7$, is obtained by removing a portion of the chemical water from the acid-ortho-phosphate of calcium, namely, 2 molecules of $H_2O$ from one molecule of ortho-monocalcic phosphate; but we do not limit ourselves to preparations in which the precise amount of chemical water above indicated is withdrawn. We include within the scope of our invention preparations in which more chemical water is included than that shown by the formula $CaH_2P_2O_7$, but substantially less than that in acid-ortho-phosphate of calcium.

It is found that the amount of chemical water which will be removed in preparations subjected to treatment at temperatures approximately within the range from 300° F. to 325° F. produces ordinarily one having the best qualities for use in baking preparations; but we do not limit ourselves to this range, since much higher temperatures than indicated, and thereby less chemical water than indicated, have been successfully used. However, if the acid-ortho-phosphate of calcium is treated to a temperature approximately corresponding to a red heat, so much chemical water is removed that its value as a baking preparation is practically destroyed.

We have found that the approximate limits of acid-elements which possess the desired features for baking preparations may be expressed by the formula $$M(CaH_4(PO_4)_2H_2O) - N(H_2O),$$

in which M=1 and N=1+ but it is found that the most satisfactory preparations are those produced at temperatures between 300° and 325° F.

In the preparation of the acid salt, we first produce the ordinary acid-ortho-calcium-phosphate by any suitable process, such as treating phosphoric-acid with bone-ash. With this product we mix the necessary amount (generally 5 to 10%) of potassium carbonate, calcium carbonate, trisodium phosphate, disodium phosphate, or soda ash, or, in fact, any suitable material possessing basic character. This is added simply to neutralize the traces of free phosphoric acid which are formed during the roasting process hereinafter described. We subject this mixture to a roasting process, removing first the water of crystallization and then raising the applied heat a sufficient amount to effect decomposition of the acid-ortho-phosphate of calcium and the elimination of a substantial amount of its chemical water, as hereinbefore described. We find that the best results are obtained within a range of temperature of from 300° to 325° Fahrenheit, although we do not limit ourselves to these temperatures. A lower temperature effects some change, and such treatment would, at least in part, secure the advantages of our invention. A temperature of 275° F. has been used with success, and a much higher temperature than 325° F. may also be used with success. The practical maximum limit of temperature is reached when the acid strength of the substance produced is so greatly weakened as not to be a practical substance for baking purposes.

Without specifically limiting ourselves to the aforesaid invention, we claim:

1. A baking powder or baking preparation composed of a carbonate or bicarbonate of an alkali and an acid-phosphate of calcium, substantially non-hygroscopic and substantially corresponding to the formula $CaH_2P_2O_7$, substantially as described.

2. A baking powder or baking preparation composed of a carbonate or bicarbonate of an alkali and an acid-phosphate of calcium, substantially non-hygroscopic and substantially corresponding to the formula $$M(CaH_4(PO_4)_2H_2O) - N(H_2O),$$

substantially as described.

3. A baking powder or baking preparation composed of a carbonate or bicarbonate of an alkali and an acid-phosphate of calcium, substantially non-hygroscopic and substantially corresponding to the formula $$M(CaH_4(PO_4)_2H_2O) - N(H_2O),$$

and having substantially the qualities of acid-ortho-phosphate of calcium subjected to a temperature between 275° F. and red heat, substantially as described.

4. A baking powder or baking preparation composed of a carbonate or bicarbonate of an alkali and an acid-phosphate of calcium, substantially non-hygroscopic and substantially corresponding to the formula $$M(CaH_4(PO_4)_2H_2O) - N(H_2O),$$

and having substantially the qualities of acid-ortho-phosphate of calcium subjected to a temperature between 275° F. and 375° F., substantially as described.

5. A baking powder or baking preparation including an acid element, said acid element comprising acid-ortho-phosphate of calcium subjected to a proper degree of heat to remove a substantial amount of chemical water therefrom, substantially as described.

WALTER B. BROWN.
ROBERT A. HOLBROOK.

Witnesses:
JOHN LERERENZ,
R. M. STIFF,
WALKER BANNING.